(12) United States Patent
Oku

(10) Patent No.: US 8,719,611 B2
(45) Date of Patent: May 6, 2014

(54) CHECKING FUNCTIONAL MODULE ID IN CONNECTED EXTENSION DEVICE TO POWER INSTEAD OF EXISTING CORRESPONDING FUNCTIONAL MODULE

(75) Inventor: Yusuke Oku, Nagoya (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 630 days.

(21) Appl. No.: 13/054,402

(22) PCT Filed: Apr. 10, 2009

(86) PCT No.: PCT/JP2009/057339
§ 371 (c)(1),
(2), (4) Date: Jan. 14, 2011

(87) PCT Pub. No.: WO2010/116523
PCT Pub. Date: Oct. 14, 2010

(65) Prior Publication Data
US 2011/0126031 A1    May 26, 2011

(51) Int. Cl.
*G06F 1/32*    (2006.01)
(52) U.S. Cl.
USPC ........................... 713/324; 713/320
(58) Field of Classification Search
None
See application file for complete search history.

(56) References Cited

U.S. PATENT DOCUMENTS

| 8,300,154 B2 * | 10/2012 | Hirono et al. ............... 348/730 |
| 2002/0115481 A1 | 8/2002 | Saito |
| 2010/0077191 A1 * | 3/2010 | Hirose ............................ 713/2 |

FOREIGN PATENT DOCUMENTS

| JP | 05-150872 A | 6/1993 |
| JP | 3455730 B2 | 10/2003 |
| JP | 2006-295697 A | 10/2006 |
| JP | 2009-026595 A | 2/2009 |

* cited by examiner

Primary Examiner — Kenneth Kim
(74) Attorney, Agent, or Firm — Sughrue Mion, PLLC

(57) ABSTRACT

The present invention is related to a vehicle-mounted multimedia apparatus 1 which has at least one functional module 42A, 42B, 42C ... 42N which is powered from a power source 50 to operate and an interface 12 to which an extension device 20 is to be connected. When the extension device 20 is newly connected to the interface 12, if there is an existing functional module 42B (referred to as a corresponding functional module), which corresponds to a functional module 22 provided in the extension device 20, among the existing functional module 42A, 42B, 42C ... and/or 42N which already exists in a state before said connection of the extension device, said vehicle-mounted multimedia apparatus 1 stops powering the corresponding functional module 42B and powers the functional module 22 provided in the extension device 20.

8 Claims, 5 Drawing Sheets

CHECKING FUNCTIONAL MODULE ID IN CONNECTED EXTENSION DEVICE TO POWER INSTEAD OF EXISTING CORRESPONDING FUNCTIONAL MODULE

CROSS REFERENCE TO RELATED APPLICATIONS

This application is a National Stage of International Application No. PCT/JP2009/057339 filed Apr. 10, 2009, the content of which is incorporated herein by reference in its entirety.

TECHNICAL FIELD

The present invention is related to a vehicle-mounted multimedia apparatus having at least one functional module which is powered from a power source to operate and an interface to which an extension device is to be connected, a method of powering the same, etc.

BACKGROUND ART

JP 3455730 B discloses electronic equipment comprising connecting means for connecting an extended unit for functional extension; instructing means for instructing to power the extended unit; and powering control means for starting powering the extended unit while keeping a main power source in the electronic equipment body off when instructed by the instructing mean to power the extended unit under a situation where the main power source in the electronic equipment body is in its off state. According to this technique, in a situation where only the function of the extended unit is desired, only the extended unit is powered. Thus, it is possible to reduce power consumption of the electronic equipment when compared with a configuration in which the electronic equipment as a whole is powered even in such a situation.

Recently, due to rapid evolution speed of the multimedia apparatus of vehicles, an extended life of the vehicle itself, etc., such a configuration of the multimedia apparatus to which an extension device can be retrofitted to the existing multimedia apparatus so as to enable increasing functionality of the existing multimedia apparatus is proposed. The electronic equipment disclosed in JP 3455730 B also has a configuration of its kind.

There are ways of increasing functionality of the existing multimedia apparatus by connecting the extension device; one way is to add a new function which does not exist in the existing multimedia apparatus by using the extension device, and another way is to increase functionality of a particular function which exists in the existing multimedia apparatus by using the extension device. According to the latter way, when the extension device is connected, then the functional module of the extension device replaces a corresponding existing functional module in the existing multimedia apparatus. This may lead to a situation where the existing functional module may not be substantially used. Even in such a situation, the existing functional module consumes electric power as standby power, etc. This is not desirable in terms of power saving.

DISCLOSURE OF INVENTION

Therefore, an object of the present invention is to provide a vehicle-mounted multimedia apparatus, a method of powering the same, etc., which can effectively reduce power consumption in a state where the extension device is connected.

In order to achieve the aforementioned objects, according to the first aspect of the present invention, a vehicle-mounted multimedia apparatus is provided which has at least one functional module which is powered from a power source to operate and an interface to which an extension device is to be connected.

When an extension device is newly connected to the interface, if there is an existing functional module (referred to as a corresponding functional module), which corresponds to a functional module provided in the extension device, among the existing functional module(s) which already exists in a state before said connection of the extension device, said vehicle-mounted multimedia apparatus stops powering the corresponding functional module and powers the functional module provided in the extension device.

According to the present invention, a vehicle-mounted multimedia apparatus, a method of powering the same, etc., are obtained which can effectively reduce power consumption in a state where the extension device is connected.

Figure 1:
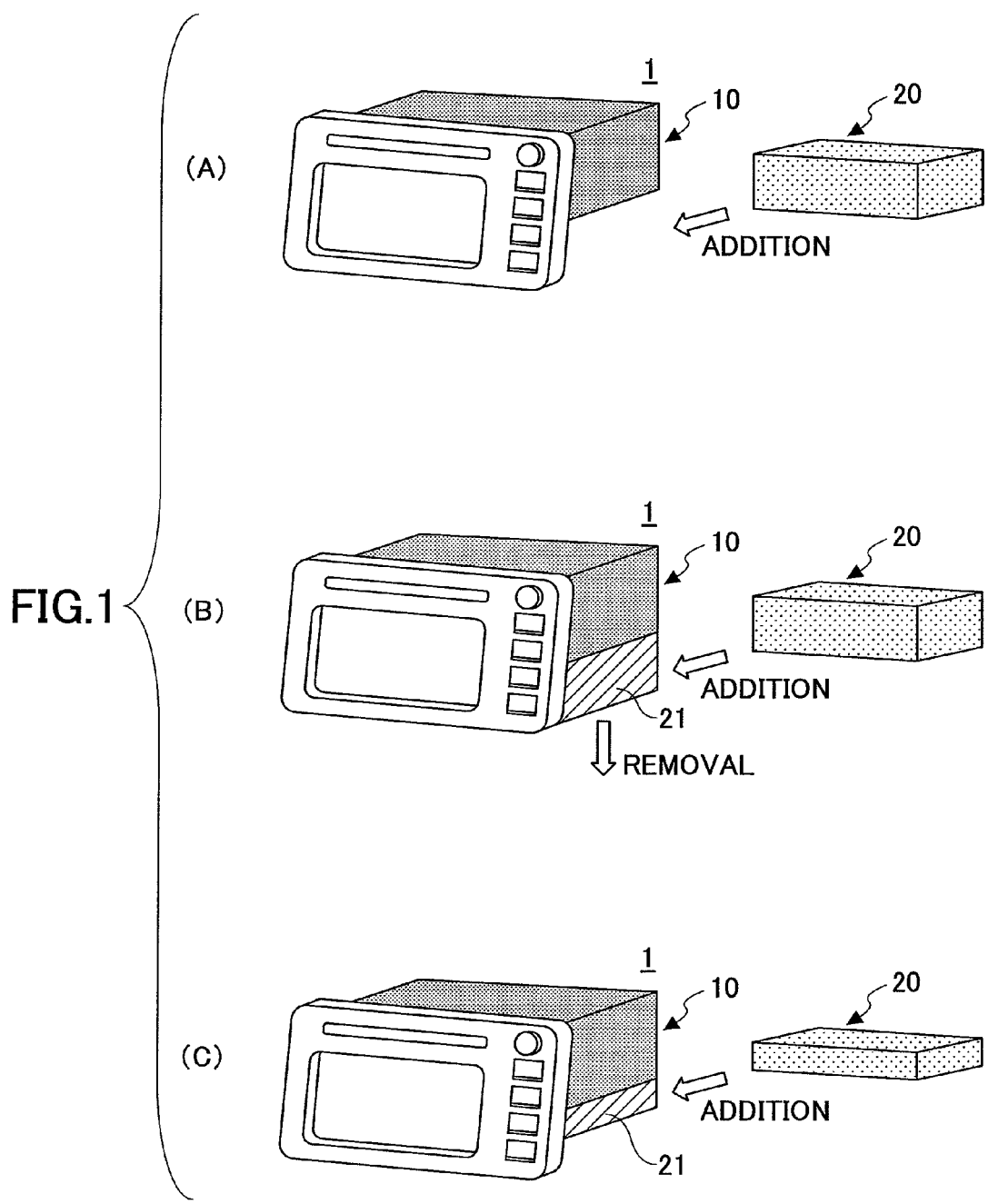
FIG. 1 is a diagram for schematically showing several examples of ways of connecting an extension device(s) to a vehicle-mounted multimedia apparatus 1 according to an example of the present invention.

EXPLANATION FOR REFERENCE NUMBER 1 vehicle-mounted multimedia apparatus
10 base system
12 external extension interface
20 extension device
21 old extension device
22 functional module in an extension device
22B, 22P individual functional module in an extension device
24 storing part
30 control device
32 external device recognizing management part
33 base device information storing part
34 module configuration determining part
36 functional configuration switching management part
38 power management part
40 functional module in a base system side
40A, 40B, 40C . . . 40N individual functional modules in a base system
42A, 42B, 42C . . . 42N switch
50 power source

BEST MODE FOR CARRYING OUT THE INVENTION

In the following, the best mode for carrying out the present invention will be described in detail by referring to the accompanying drawings.

FIG. 1 is a diagram for schematically showing several examples of ways of connecting an extension device(s) to a vehicle-mounted multimedia apparatus 1 according to an example of the present invention.

FIG. 1(A) shows a general example in which an extension device 20 is connected to a base system (fundamental system) 10 of the vehicle-mounted multimedia apparatus 1. FIG. 1(B) shows another example in which an old extension device 21 has already been connected to the base system 10 of the vehicle-mounted multimedia apparatus 1, and afterward the old extension device 21 is removed and a new extension device 20 is connected to the vehicle-mounted multimedia apparatus 1. In other words, the example in which the old extension device 21 is replaced with the new extension device 20 is shown. FIG. 1(C) shows another example in which an old extension device 21 has already been connected to the base system 10 of the vehicle-mounted multimedia apparatus 1, and afterward a new extension device 20 is additionally connected to the vehicle-mounted multimedia apparatus 1. In other words, the example, in which the old extension device 21 is maintained and the new extension device 20 is added, is shown. In the example shown in FIG. 1(C), when the additional extension device 20 is connected, the old extension device 21 has already functioned integrally with the base system 10. Thus, in the present specification, the old extension device 21 such as shown in FIG. 1(C) is regarded as a part of the base system 10.

It is noted that according to the vehicle-mounted multimedia apparatus 1 to which such an extension device 20 can be retrofitted, it is possible to flexibly respond to a development of technique or a trend after selling the vehicle-mounted multimedia apparatus 1 by retrofitting the extension device 20 to the vehicle-mounted multimedia apparatus 1. Further, by retrofitting the extension device 20 to the vehicle-mounted multimedia apparatus 1, it is possible to absorb a difference in functional specifications due to the respective markets (for example, a difference between the functional specifications for Japan and the functional specifications for Europe) and enhance the salability.

Figure 2:
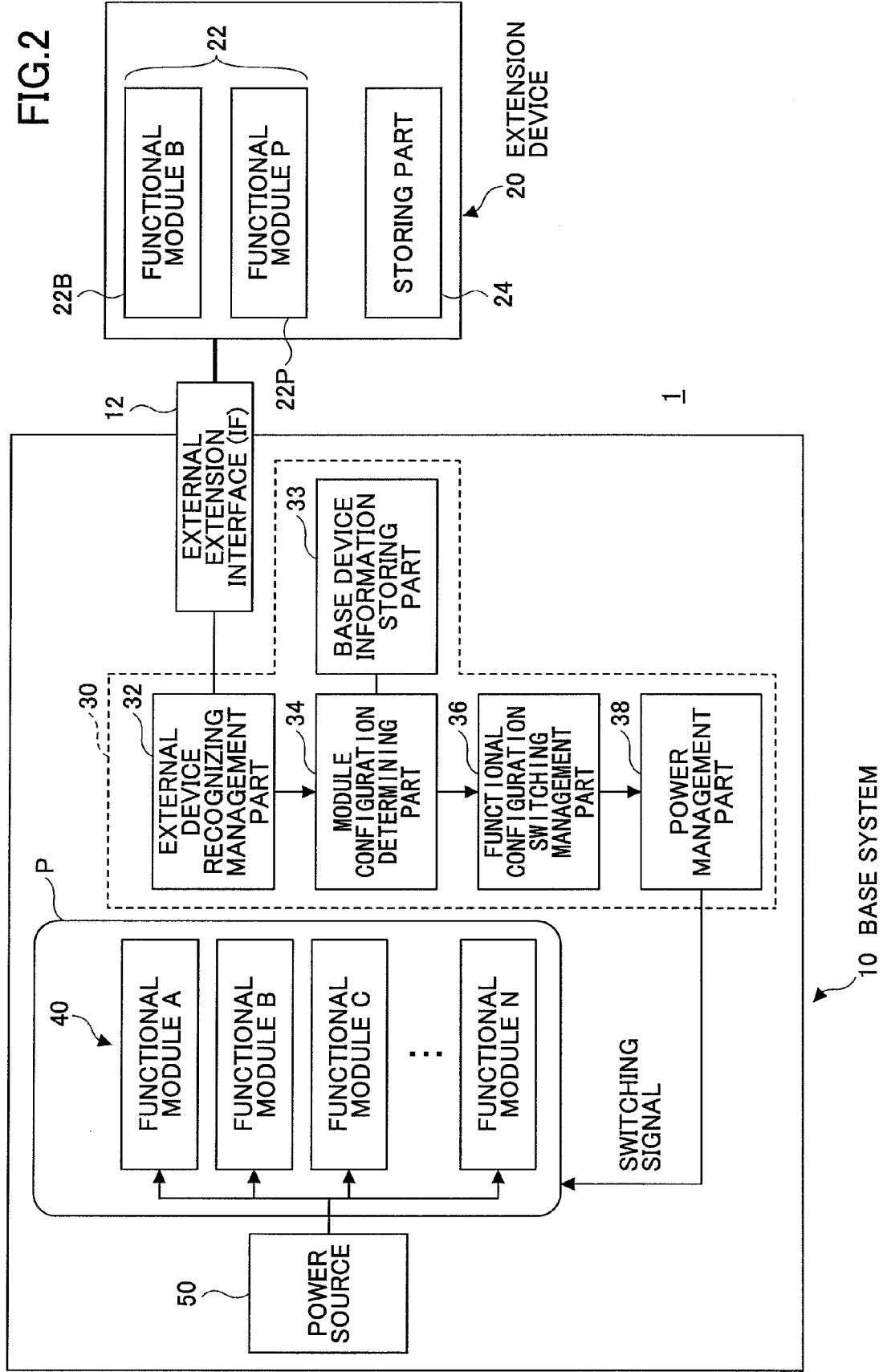
FIG. 2 is a diagram for showing a main configuration of the vehicle-mounted multimedia apparatus 1 according to an example of the present invention.
Figure 3:
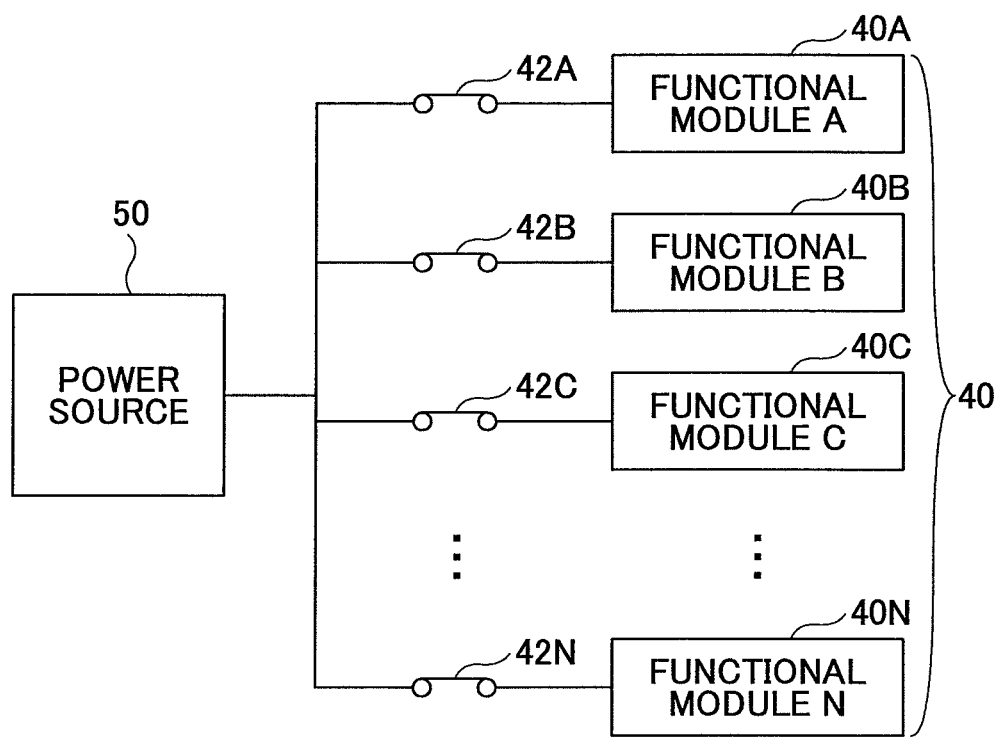
FIG. 3 is a magnified view of a portion P in FIG. 2.

FIG. 2 is a diagram for showing a main configuration of the vehicle-mounted multimedia apparatus 1 according to an example of the present invention. It is noted that in FIG. 2 a system in which the extension device 20 is connected to the vehicle-mounted multimedia apparatus 1 is shown. FIG. 3 is a magnified view of a portion P in FIG. 2.

The vehicle-mounted multimedia apparatus 1 includes an external extension interface 12 to which the extension device 20 is connected. The external extension interface 12 may be implemented in any form such as a USB interface, in-vehicle LAN (Local Area Network), etc. Further, more than one external extension interfaces 12 may be provided, considering the example shown in FIG. 1(C). For example, in the example shown in FIG. 1(C), more than one external extension interface 12 may be provided in the base system 10 and/or another extension interface 12 may be provided in the old extension device 21.

The vehicle-mounted multimedia apparatus 1 includes a control device 30. The control device 30 is comprised mainly of a microprocessor that includes a CPU, a ROM in which process programs are stored, a RAM in which calculation results are stored, a timer, a counter, an input interface, an output interface, etc., for example. The control device 30 includes, as a main functional part implemented by the CPU, an external device recognizing management part 32, a base device information storing part 33, a module configuration determining part 34, a functional configuration switching management part 36 and a power management part 38.

The external device recognizing management part 32 grasps (recognizes) the extension device 20 connected to the external extension interface 12. Information on the base system 10 (referred to as base device information) is stored in the base device information storing part 33. The base device information includes information (functional module IDs) for identifying the functional modules 40 (40A, 40B, 40C . . . 40N) which the base system 10 has, communication sequence, screen configurations, transition information, etc. The module configuration determining part 34 operates at the time of recognition of the extension device 20 by the external device recognizing management part 32 (i.e., at the time of new connection) and determines (recognizes) a functional module configuration provided in the extension device 20 connected to the external extension interface 12 and a functional module configuration provided in the base system 10. The functional configuration switching management part 36 switches from a part of the functional modules 40 provided in the base system 10 to the functional module 22 provided in the extension device 20, if necessary. The power management part 38 operates in connection with the switch operation of the functional configuration switching management part 36 to disconnect power supply to the part of the functional modules 40. It is noted that details of examples of the functions of these parts 32, 34, 36 and 38 are described below.

The vehicle-mounted multimedia apparatus 1 includes functional modules 40. The functional modules 40 are provided for implementing various functions of the vehicle-mounted multimedia apparatus 1. The functional modules 40 include more than one functional module in general. Typically, the functional modules 40 include a module for implementing a display function, an FM audio module, a Bluetooth (Trademark) module, a CD deck module, a USB audio module, etc. In the example shown in FIG. 2, the functional modules 40 include twenty functional modules 40A, 40B, 40C . . . 40N.

The extension device 20 includes a functional module 22 for implementing a function which cannot be implemented by the functional modules 40 of the base system 10. It is noted that in the example shown in FIG. 2 the functional module 22 includes two functional modules 22B, 22P where the functional module 22B of the extension device 20 is an advanced version of the function module 40B of the base system 10 (whose function is extended), and the functional module 22P is a functional module which implements a new function which does not correspond to any function of the functional modules 40A, 40B, 40C . . . 40N of the base system 10.

The extension device 20 includes a storing part 24 configured by an appropriate memory device. Information on the extension device 20 (referred to as extension device information) is stored in advance in the storing part 24. The extension device information includes information (functional module ID) for identifying the functional module 22 which the extension device 20 has, communication sequence, screen configurations, transition information, etc.

The vehicle-mounted multimedia apparatus 1 includes a power source 50. The power source 50 may be a power source terminal (typically, an IG terminal or an ACC terminal) connected to a vehicle-mounted battery. The power source 50 automatically turns on when an ACC or IG switch is turned on under a situation where a power button on a surface of a casing of the vehicle-mounted multi-media apparatus 1, for example, is pressed down by a user operation. The various functional modules 40A, 40B, 40C . . . 40N of the base system 10 of the vehicle-mounted multi-media apparatus 1 are connected to the power source 50. Thus, the functional modules 40A, 40B, 40C . . . 40N operate on power supplied from the power source 50. In other words, in an ON state of the power source 50, each of the functional modules 40A, 40B, 40C . . . 40N is connected to the vehicle-mounted battery unless disconnection described below is performed.

Here, in this embodiment, as shown in FIG. 3, the functional modules 40A, 40B, 40C . . . 40N are configured to have power lines which can be disconnected from the power source 50 independently. Specifically, as shown in FIG. 3, the power line from the power source 50 is branched in parallel to the functional modules 40A, 40B, 40C . . . 40N, and the branched lines are provided with corresponding power disconnecting switches 42A, 42B, 42C . . . 42N. The power disconnecting switches 42A, 42B, 42C . . . 42N are normally in their ON states and switched to their OFF states in response to switching signals (OFF instructions) from the power management part 38 as described below. With this arrangement, it is possible to separately control the power supply to the functional modules 40A, 40B, 40C . . . 40N, such as by turning off the power disconnecting switch 42C if only the power supply to the functional module 40C among the functional modules 40A, 40B, 40C . . . 40N is desired to be disconnected, for example. It is noted that the power disconnecting switches 42A, 42B, 42C . . . 42N may be implemented by semiconductor switching elements, relays, etc.

It is noted that the example shown in FIG. 3 is configured in such a manner that the separate control of the power supply is available for all the functional modules 40A, 40B, 40C . . . 40N; however, it can be configured in such a manner that the separate control of the power supply is available for only a part of the functional modules 40A, 40B, 40C . . . 40N. For example, the separate control of the power supply may be available for the functional modules 40A, 40B and 40C only. In this case, only the power disconnecting switches 42A, 42B and 42C are set. In this case, it is desirable that the functional modules 40A, 40B and 40C to which the power supply can be controlled separately are developing functional modules which have room for functional extensibility or developability. This is because the developing functional modules which have room for functional extensibility or developability are likely to be subject to the functional extension or enhancement later by the extension device 20, and therefore are likely to need disconnection of the power supply described below. Further, if considering the balance between the energy saving effect due to the disconnection of the power supply and the cost increase due to the addition of the hardware of the switches, it is desirable that the functional modules 40A, 40B and 40C to which the power supply can be controlled separately are functional modules which have relatively high standby power, in particular.

Figure 4:
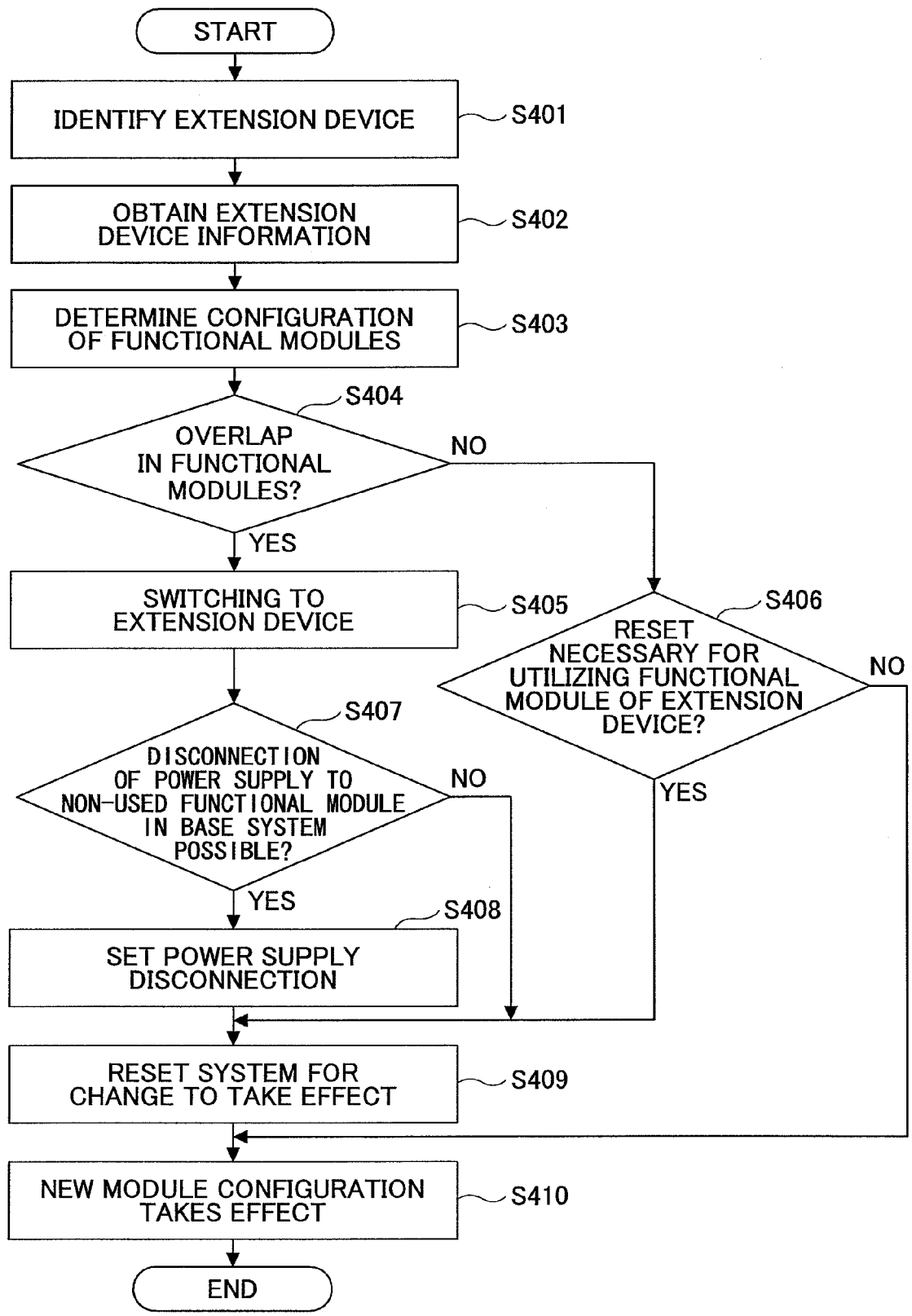
FIG. 4 is a flowchart of a main process routine executed by a control device 30 of the vehicle-mounted multimedia apparatus 1 according to the present embodiment.

FIG. 4 is a flowchart of a main process routine (a power supply method) executed by the control device 30 of the vehicle-mounted multi-media apparatus 1 according to the present embodiment. In the following, FIG. 2 and FIG. 3 are referred to, if necessary, for the purpose of an explanation of FIG. 4. The process routine shown in FIG. 4 may be initiated if the extension device 20 is newly connected to the external extension interface 12. It is noted that for this reason, for example, the extension device 20 and/or the external extension interface 12 may be configured to supply a signal, which indicates that the extension device 20 is connected to the external extension interface 12, to the external device recognizing management part 32 when the extension device 20 is connected to the external extension interface 12.

In step 401, in the external device recognizing management part 32 a process for recognizing the extension device 20 newly connected to the external extension interface 12 is performed. This recognition process includes determining whether the extension device 20 newly connected to the external extension interface 12 is available, determining whether it is a valid device, etc.

In step 402, in the external device recognizing management part 32 the extension device information is obtained from the extension device 20 newly connected to the external extension interface 12. As described above, the extension device information includes information (functional module ID) for identifying the functional modules 40 of the base system 10. The extension device information is retrieved from the storing part 24 in the extension device 20 and supplied to the base system 10.

In step 403, in module configuration determining part 34 a functional module configuration determining process is performed based on the extension device information (functional module ID, in particular) obtained in step 402 and the base device information (functional module IDs in particular) related to the base system 10. It is noted that the base device information is read out from the base device information storing part 33 by the module configuration determining part 34. Further, if the example shown in FIG. 1(C) is considered, the base device information may be updated by adding the extension device information obtained in step 402 at the time of completion of the process routine shown in FIG. 4. Further, if the example shown in FIG. 1(B) is considered, when the old extension device 21 is removed, the base device information may be updated by deleting the extension device information associated with the old extension device 21 (i.e., restoring the previous status existing before the upgrade by the extension device information associated with the old extension device 21). Alternatively, in the case of the example shown in FIG. 1(C), the base device information may be read out from the base device information storing part 33 and the storing part 24 of the old extension device 21.

The functional module configuration determining process in this step 403 is a process for determining whether there is an overlap between the functional modules 40 of the base system 10 and the functional module 22 related to the extension device 20. The overlap includes a relationship such as an extension or enhancement of a function or upgraded version. Thus, the functional module configuration determining process may be implemented by comparing the functional module IDs related to the functional modules 40 of the base system 10 with the functional module ID related to the extension device 20.

In step 404, in the module configuration determining part 34 it is determined whether there is an overlap between the functional modules 40 of the base system 10 and the functional module 22 related to the extension device 20 based on the comparison process in step 403. For example, if one of the functional module IDs related to the functional modules 40 of the base system 10 corresponds to the functional module ID related to the extension device 20, that is to say, there is an overlap, the process routine goes to step 405. If not, the process routine goes to step 406. It is noted that if there are more than one functional module 22 in the extension device 20 and only a part of the functional modules 22 has an overlap, the processes from step 405 and the processes from 406 may be performed independently and separately with respect to the overlapped functional module and the non-overlapped functional module, and then the process of step 409 or 410 may be performed finally. For example, in the example shown in FIG. 2, as described above, there are two functional module 22B and 22P in the extension device 20 and the functional module 22B of the extension device 20 is the developed version of the functional module 40B of the base system 10. In this case, with respect to the functional module 22B causing the overlap, the process routine goes to step 405, and with respect to the functional module 22P causing no overlap (i.e., providing an additional function), the process routine goes to step 406.

In step 405, in the functional configuration switching management part 36, a function switching process is performed to transfer the functions which users utilize to the side of the extension device 20. Specifically, the functional module 40 of the base system 10 which overlaps the functional module 22 of the extension device 20 is replaced with the functional module 22 of the extension device 20. For example, in the example shown in FIG. 2, the functional module 40B of the base system 10 is replaced with the functional module 22B of the extension device 20. Specifically, in the example shown in FIG. 2, in the functional configuration switching management part 36, the function switching process is performed so that the functional module 22B of the extension device 20 becomes available instead of the functional module 40B of the base system 10.

In step 406, it is determined whether a reset of the system is necessary to make the functional module 22 of the extension device 20 available. If it is determined that the reset of the system is necessary, the process routine goes to step 409 and if not, the process routine goes to step 410.

In step 407, in the power management part 38, it is determined whether a separate disconnection of the power supply to the functional module 40 of the base system 10 which is no longer used as a result of the function switching process in step 405 is possible. In the example shown in FIG. 2 and FIG. 3, whether the separate disconnection of the power supply is possible may be determined by determining whether there is a power disconnecting switch such as the power disconnecting switch 42A. It is noted that in the example shown in FIG. 4, since the separate disconnection of the power supply is possible for every functional module 40A, 40B, 40C ... 40N, the determination result in step 407 is always affirmative. Thus, the determination process of step 407 may be performed if the separate disconnection of the power supply is possible for a part of the functional modules 40A, 40B, 40C ... 40N. In this case, information representing for which of the functional modules 40A, 40B, 40C ... 40N the separate disconnection of the power supply is possible may be stored in a predetermined memory device of the base system 10 in advance.

In step 407, if the separate disconnection of the power supply is possible for the overlapped functional module 40 of the base system 10, the process routine goes to step 408. If not, the process routine goes to step 409.

In step 408, in the power management part 38, a power supply disconnection setting process for the overlapped functional module 40 of the base system 10 is performed. It is noted that in the example shown in FIG. 2, the power supply disconnection setting process for the functional module 40B of the base system 10 is performed. In this case, the power supply disconnection setting process for the functional module 40B is a process for opening the power disconnecting switches 42B. This is generation and application of a switching signal (an OFF instruction) for the power disconnecting switches 42B. It is noted that the power supply disconnection setting process may involve a change of a system management program necessary for the disconnection of the power supply (power source boot-up sequence, a power source control program, etc.) and a change of a program for making the functional module 22 in the extension device 20 available.

In step 409, the reset of the system is performed for the change due to the new connection of the extension device 20 to take effect.

In step 410, a new module configuration has taken effect. In other words, after restart of the vehicle-mounted multi-media apparatus 1, the function of the extension device 20 is reflected, and an unnecessary part of the power supply on the base system side is disconnected.

In this way, according to one example of the power supply method for the vehicle-mounted multi-media apparatus 1 shown in FIG. 4, when the overlap of the function in the base system 10 occurs due to the connection of the extension device 20, power supply to a hardware resource related to the overlapped function in the base system 10 is disconnected. Therefore, it is possible to reduce unnecessary power consumption by the overlapped functional module in the base system 10.

Figure 5:
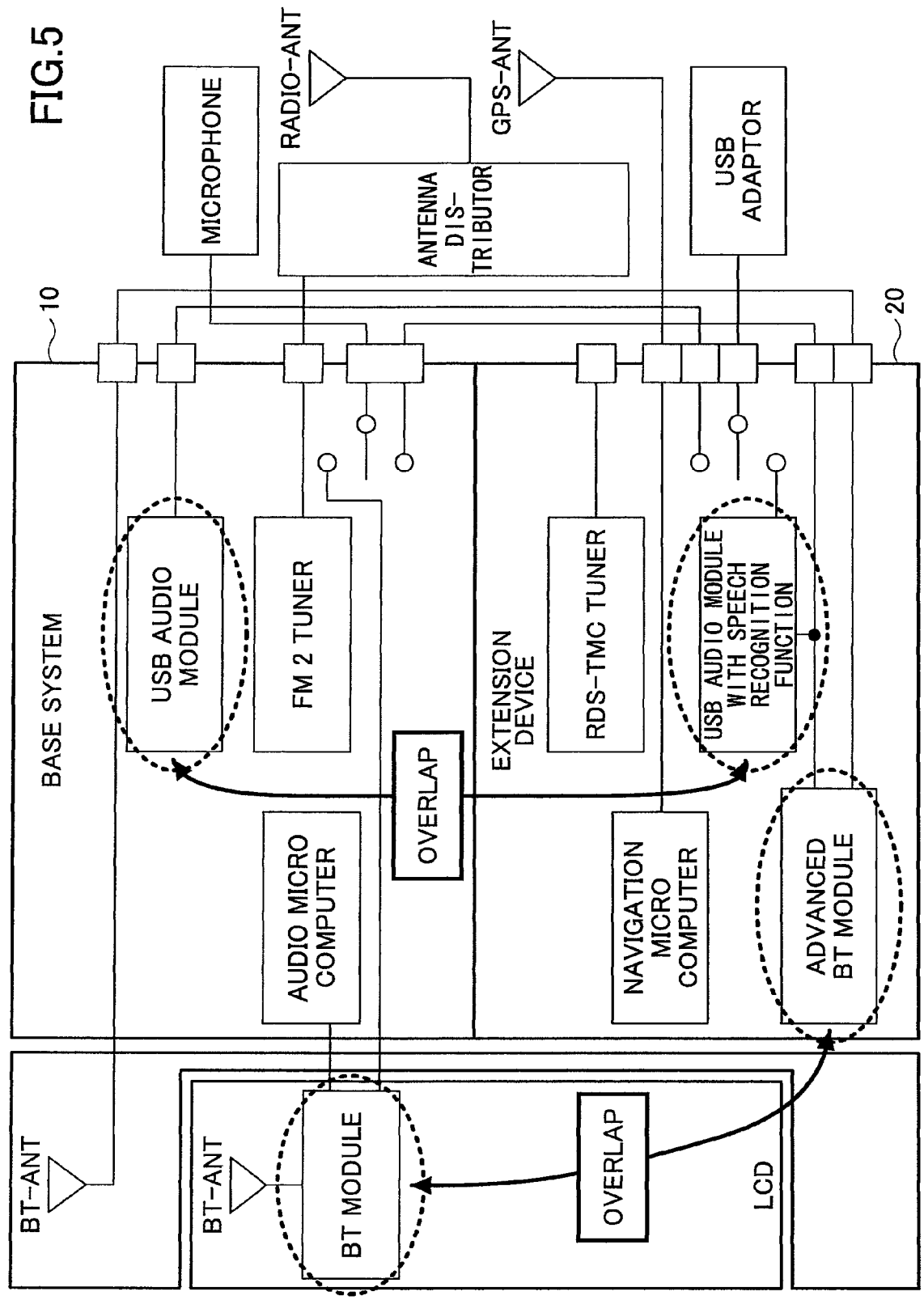
FIG. 5 is a diagram for showing a concrete example of a power supply method in the vehicle-mounted multimedia apparatus 1 according to the present embodiment.

FIG. 5 is a diagram for showing a concrete example of the power supply method in the vehicle-mounted multi-media apparatus 1 according to the present embodiment (i.e., a power supply disconnecting method at the time of connection of the extension device 20).

FIG. 5 shows a status where the extension device 20 has been connected to the base system 10. The functional modules 40 in the base system 10 includes a module for implementing a display function, an FM audio module, a Bluetooth (BT) module designed for a hands-free function only, a CD deck module, a USB audio module not designed for a speech recognition function, etc. FIG. 5 shows a case where an advanced BT module designed for handling not only a hands-free function but also an audio function (i.e., capable of receiving music data from a mobile phone or a mobile music terminal via Bluetooth communication and reproduce it in the vehicle, for example), etc.; a USB audio module equipped with a speech recognition function; and a navigation function having local specifications (the functional specifications for Europe, for example) are added as the extension device 20. In this case, the overlap with respect to the BT module and the USB audio module occurs between the base system 10 and the extension device 20.

In the example shown in FIG. 5, the BT module including a Bluetooth (BT) antenna, a chip dedicated to decoding of the USB audio signals, etc., in the base system 10 are no longer utilized because they are replaced with the corresponding functions of the extension device 20 due to the connection of the extension device 20. In this case, according to the embodiment, as described above, the power supply to the BT module including the BT antenna, a chip dedicated to decoding of the USB audio signals, etc., in the base system 10 is disconnected. With this arrangement, it is possible to effectively reduce the unnecessary power consumption including the standby power, etc.

The present invention is disclosed with reference to the preferred embodiments. However, it should be understood that the present invention is not limited to the above-described embodiments, and variations and modifications may be made without departing from the scope of the present invention.

For example, in the above-described embodiment, it may be determined whether an extension device 20 is newly connected when the IG switch or the ACC switch is turned on. In this case, the process routine shown in FIG. 4 may be initiated if it is determined that an extension device 20 is newly connected.

Further, in the above-described embodiment, a discrimination method between the respective functional modules is arbitrary. Typically, the respective functional modules are discriminated based on a functional difference. However, the respective functional modules may be discriminated between elements (groups) to which the power supply can be disconnected separately, for example. Further, a unit of the functional module is arbitrary. A unit of the functional module may be a unit of a chip, or a unit including a chip and a peripheral device.

The invention claimed is:

1. A vehicle-mounted multimedia apparatus having at least one functional module which is powered from a power source to operate and an interface to which an extension device is to be connected, wherein
functional module identifying means for identifying a functional module provided in the extension device if the extension device is newly connected to the interface;
determining means for determining whether before the extension device is connected said vehicle-mounted multimedia apparatus has a functional module (referred to as a corresponding functional module) which corresponds to a functional module in the identified extension device; and
means for stopping powering the corresponding functional module and performing powering of the functional module provided in the extension device if it is determined by the determining means that said vehicle-mounted multimedia apparatus has the corresponding functional module,
wherein the functional module identifying means identifies the functional module provided in the extension device based on an extension device functional module ID which is obtained from the extension device newly connected to the interface, said extension device functional module ID being stored in a storing par of the extension device newly connected to the interface and representing the functional module provided in the extension device.

2. The vehicle-mounted multimedia apparatus claimed in claim 1 having plural functional modules which are powered from the power source to operate, said plural functional modules including a functional module from which power supply from the power source can be disconnected in an independent manner with respect to other functional modules, wherein
if the corresponding functional module is the functional module from which power supply from the power source can be disconnected in an independent manner with respect to other functional modules, the power supply to the corresponding functional module is disconnected.

3. The vehicle-mounted multimedia apparatus claimed in claim 2, wherein if the corresponding functional module is not the functional module from which power supply from the power source can be disconnected in an independent manner with respect to the other functional modules, the power supply to the corresponding functional module is not disconnected.

4. The vehicle-mounted multimedia apparatus claimed in claim 1 having more than two interfaces to which more than two extension devices are to be connected, wherein
if a second extension device is newly connected to a second interface in a state where a first extension device is connected to a first interface, a functional module provided in the first extension device is regarded as the existing functional module.

5. The vehicle-mounted multimedia apparatus claimed in claim 1, further comprising storing means for storing a base device functional module ID which represents the functional module said vehicle-mounted multimedia apparatus has before said newly connected extension device is connected to said vehicle-mounted multimedia apparatus, wherein
the determining means perform the determination by comparing the extension device functional module ID obtained from the extension device newly connected to the interface with the base device functional module ID stored in the storing means.

6. A system comprising the vehicle-mounted multimedia apparatus claimed in claim 1 and an extension device connected to the interface.

7. A system comprising the vehicle-mounted multimedia apparatus claimed in claim 1 and an extension device connected to the interface.

8. A method of powering a vehicle-mounted multimedia apparatus
which has at least one functional module which is powered from a power source to operate and an interface to which an extension device is to be connected,
said method comprising:
a step of identifying a functional module provided in the extension device if it is detected that the extension device is newly connected to the interface;
a determining step of determining whether before the extension device is connected said vehicle-mounted multimedia apparatus has a corresponding functional module which corresponds to a functional module in the identified extension device; and
a step of stopping powering the corresponding functional module and performing powering of the functional module provided in the extension device if it is determined in the determining step that said vehicle-mounted multimedia apparatus has the corresponding functional module,
wherein the step of identifying the functional module provided in the extension device is based on an extension device functional module ID which is Obtained from the extension device newly connected to the interface, said extension device functional module ID being stored in a storing part of the extension device newly connected to the interface and representing the functional module provided in the extension device.

* * * * *